A. GAGE.
SPRING WHEEL.
APPLICATION FILED OCT. 29, 1912.

1,084,421.

Patented Jan. 13, 1914.

WITNESSES

INVENTOR
Arthur Gage,
his Attorney

UNITED STATES PATENT OFFICE.

ARTHUR GAGE, OF LONG LANE, MISSOURI.

SPRING-WHEEL.

1,084,421.  Specification of Letters Patent.  Patented Jan. 13, 1914.

Application filed October 29, 1912.  Serial No. 728,452.

*To all whom it may concern:*

Be it known that I, ARTHUR GAGE, a citizen of the United States, residing at Long Lane, in the county of Dallas and State of Missouri, have invented new and useful Improvements in Spring-Wheels, of which the following is a specification.

My invention relates broadly to the class of spring wheels and aims to provide a device to supplant the pneumatic wheel now commonly in use.

The primary object of my invention is to provide a wheel of the type aforesaid consisting of resilient elements, the combined elasticity of which will counterbalance and supersede that embodied in the ordinary pneumatic tire.

Another object of my invention is to provide a spring wheel wherein the supporting elements are disposed in compact relation with each other, yet which can be removed and replaced by a new part if the occasion should require, without dismembering the entire device.

Still another object of my invention relies in the characteristics of strength and lightness obviously displayed.

With the above and other objects in view, my invention relates to such details of construction and in the combination and arrangement of the several parts as will be hereinafter more fully described and specifically pointed out in the appended claims.

In describing my invention in detail, reference will be had to the accompanying drawings, wherein like characters denote like or corresponding parts throughout the several views, and in which:—

Figure 1:
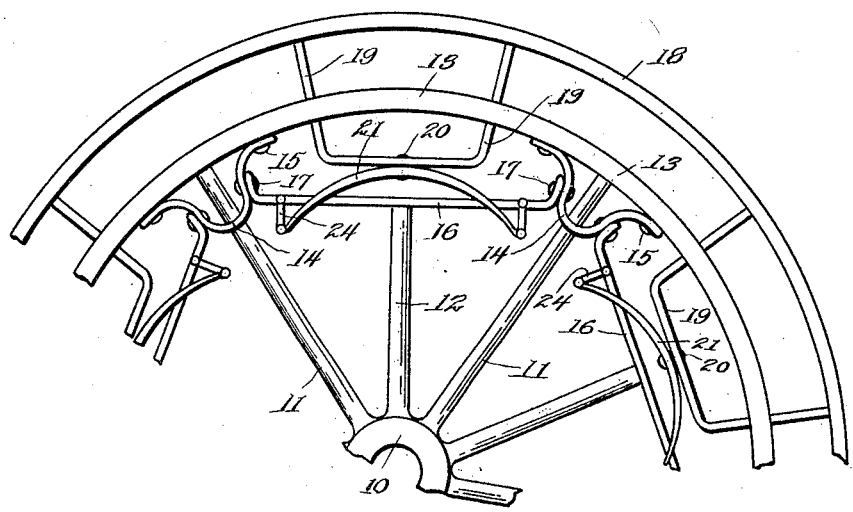
Figure 2:
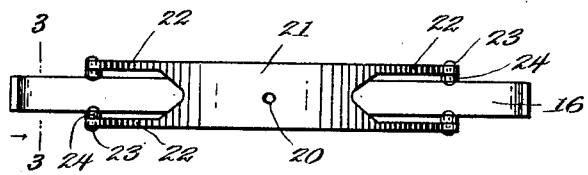
Figure 3:
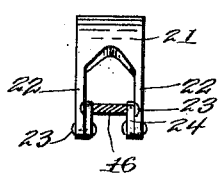

Figure 1 is a fragmentary view of a wheel embodying my invention. Fig. 2 is a plan view of one of the resilient elements, illustrating clearly the manner in which the same is supported, and Fig. 3 is a sectional view taken upon line 3—3 of Fig. 2 looking in the direction of the arrow.

In the accompanying drawings wherein is illustrated the preferred form of my invention, the numeral 10 designates the hub of the wheel having alternating long and short spokes 11 and 12, respectively, radiating therefrom, the spokes 11 being rigidly secured to an inner rim 13, while the short spokes are secured as will be hereinafter set forth. Substantially U-shaped brackets 14 are secured upon the inner periphery of the inner rim as shown at 15 and have angle bars 16 secured thereto as shown at 17 to which are secured the upper ends of the short spokes 12. An outer rim 18 is provided which has provided thereon numerous substantially U-shaped members 19, the arms of the latter projecting through slots, not shown, in the inner rim and being secured as shown at 20 to a leaf spring 21. This leaf spring has pairs of extensions 22 provided at each of its ends, each of which extensions has pivotal connection as shown at 23 to lugs 24 which depend from the under side of the angle members 16. By this arrangement it will be recognized that a slight circumferential movement is permitted to the outer rim and also a considerable radial movement, thereby giving a great deal of elasticity and absorbing the shock received thereby before being transmitted to the vehicle.

I desire to lay the greatest stress upon the simplicity of my invention and it is thought that the advantages and novel features thereof will be readily comprehended from the foregoing disclosure.

I desire it to be understood that I may make slight changes in the construction and in the arrangement and combination of the several parts provided such changes fall within the scope of the subjoined claims.

Having thus fully described my invention, what I claim as new and desire to secure by Letters Patent is:—

1. In a device of the character described, a hub having alternating long and short spokes radiating therefrom, an inner rim directly connected with said long spokes, means employing the use of angle members for connecting said short spokes with said inner rim, an outer rim, substantially U-shaped members carried upon the inner periphery of said outer rim and means pivotally supported by said angle members for resiliently supporting said outer rim, as and for the purpose set forth and described.

2. In a device of the character described, a hub having alternating long and short spokes projecting therefrom, means directly connecting said long spokes to an inner rim, means employing the use of angle members for securing said short spokes to said rim, an outer rim having a plurality of U-shaped brackets projecting therefrom, said brackets being received through said inner rim, resilient supporting means pivotally carried by said angle members, and means connecting said substantially U-shaped brackets and said resilient supporting means whereby said outer rim will be held in movable relation with said inner rim, as and for the purpose set forth and described.

3. In a device of the character described, a hub having a plurality of alternating long and short spokes projecting therefrom, an inner rim having direct connection with said long spokes, said inner rim provided with brackets adjacent said long spokes, angle members connecting said brackets, said angle members having direct connection with said short spokes, lugs pivotally supported by said angle members, a resilient member pivotally carried by said lugs and projecting above said angle members, an outer rim and means connecting said outer rim and said resilient member whereby it is held in movable relation with said inner rim, as and for the purpose set forth and described.

4. In a device of the character described, a hub having a plurality of alternating long and short spokes projecting therefrom, an inner rim having direct connection with said long spokes, brackets carried upon said inner rim adjacent said long spokes, angle members connecting said brackets, lugs depending from said angle members, said angle members having direct connection with said short spokes, a resilient member having extensions formed at each extremity thereof, said extensions being pivotally secured to said lugs, said resilient member extending through and carried by the said angle members, an outer rim, substantially U-shaped brackets carried by said outer rim and projecting through said inner rim, said U-shaped brackets having connection with said resilient member, as and for the purpose set forth and described.

5. A resilient wheel including a hub, a plurality of alternating long and short spokes radiating from said hub, a rim, the inner periphery thereof being in engagement with the outer end of each of said long spokes, a plurality of substantially U-shaped brackets the opposite ends of each of which are fixedly secured to the inner periphery of said rim adjacent said long spokes, means extending between each pair of said brackets and having engagement therewith, an arcuate leaf spring carried by said means, and a rim arranged exterior of said first mentioned rim, and being associated with said leaf springs for the purpose specified.

6. A resilient wheel including a hub, a plurality of alternating long and short spokes radiating from said hub, a rim engaging with said long spokes, a plurality of resilient brackets arranged at intervals on the interior of said rim, an angle member interposed between each pair of said brackets, and having connection therewith, an arcuate leaf spring movably connected to each of said angle members, a rim arranged exterior of said first mentioned rim and in spaced relation thereto, and a plurality of substantially U-shaped elements arranged in uniformly spaced apart relation on said second mentioned rim and having engagement with said arcuate leaf springs for the purpose set forth.

ARTHUR GAGE.

Witnesses:
FRANK C. WILSON,
GEO. R. BOOTH.

---

Copies of this patent may be obtained for five cents each, by addressing the "Commissioner of Patents, Washington, D. C."